United States Patent [19]

Coplan

[11] Patent Number: 4,709,831

[45] Date of Patent: Dec. 1, 1987

[54] THREADED END ENCLOSURE

[75] Inventor: Myron J. Coplan, Natick, Mass.

[73] Assignee: Albany International Corporation, Menands, N.Y.

[21] Appl. No.: 830,622

[22] Filed: Feb. 18, 1986

Related U.S. Application Data

[63] Continuation-in-part of Ser. No. 807,256, Dec. 10, 1985, abandoned.

[51] Int. Cl.$^4$ .............................................. B65D 53/00
[52] U.S. Cl. .................................... 220/304; 220/288; 220/3
[58] Field of Search ........................... 220/288, 304, 3

[56] References Cited

U.S. PATENT DOCUMENTS 2,624,488  1/1953  Pritchard .............................. 220/304

Primary Examiner—George T. Hall
Attorney, Agent, or Firm—Kane, Dalsimer, Sullivan, Kurucz, Levy, Eisele and Richard

[57] ABSTRACT

A separatory module for use in separation of fluids by various methods i.e. ultra filtration, hyper filtration, reverse osmosis, or dialysis, includes a pressure shell encasing the hollow separatory fibers. The pressure shell contains threaded connections to end plugs at either end. The threaded connections provide sufficient pressure resistance to serve as a pressure container for high pressure separatory techniques. In addition, a seal is provided on the threaded end plugs so that when the end plug is threaded into the cylinder the end plugs act as a pressure stop and a fluid tight seal.

5 Claims, 5 Drawing Figures

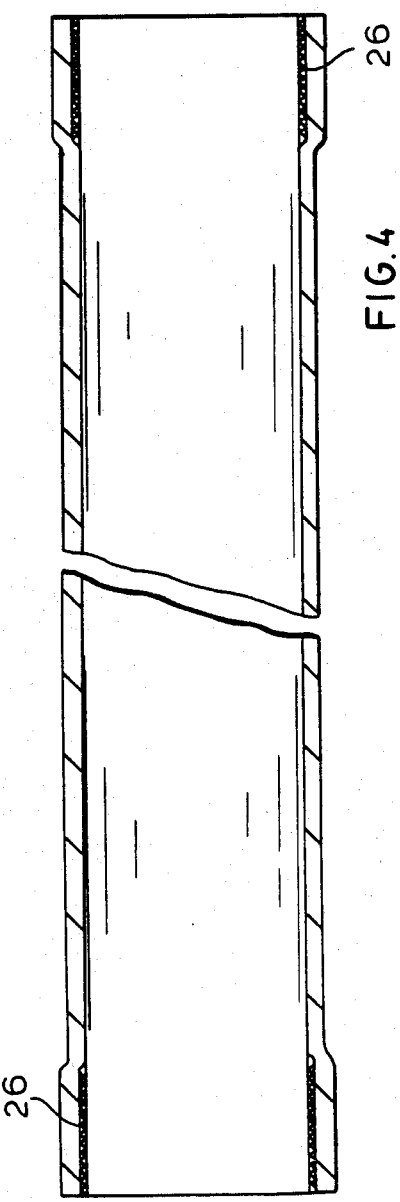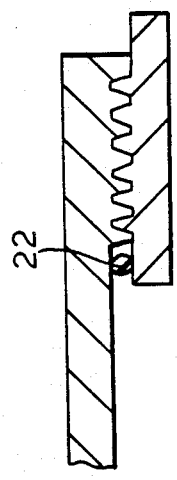

THREADED END ENCLOSURE

This patent application is a continuation-in-part of U.S. patent application Ser. No. 807,256, now abandoned.

FIELD OF THE INVENTION

This invention pertains to separatory module devices, and more particularly to a threaded shell for a hollow fiber separatory module system.

BACKGROUND OF THE INVENTION

The use of membranes to effect separation of gas/gas, liquid/liquid, and liquid/solid mixtures and solutions has achieved general industrial applicability by various methods, among them being ultra filtration, hyper filtration, reverse osmosis, and dialysis. In general, membrane elements associated with these processes are contained in vessels called modules, comprising a shell having various inlet and outlet ports and having an assembly of membranes within said shell, means for collecting permeate which passes through the membranes and emerges on their downstream faces and means for keeping permeate materials from comingling. The internal configurations are so arranged as to permit the introduction of the feed stream with or without pressure on the upstream face of the membranes.

Commonly assigned U.S. Pat. No. 4,207,192 discloses a hollow filament separatory module and a method of fabrication generally related to the invention disclosed herein. However, it will be realized by those familiar with the art that the teachings herein are equally applicable to various other membrane configurations.

In prior art devices separatory module shells have generally comprised a cylindrical shell enclosing the hollow separatory fibers and spaces for flow paths for the fluid to be separated. Various materials have been used in composition of these pressure shells in order to accommodate the exceedingly high pressures involved in hollow fiber separation techniques. These pressures are commonly on the order of 200 to 2000 psi. Occasionally pressures as high as 5000 have been contemplated. The shells are generally closed at their ends by plates of sufficient strength to withstand the high internal pressures employed in the separation process. The plates may be secured to the shells by various means such as by bolts embedded in shell ends. Alternatively, the walls of the pressure shell may be expanded at their ends to provide means for installing retaining rings or the like. In other variations of the prior art the ends of the pressure shells have grooves machined into their inner surface to accommodate split circle elements or snap rings.

SUMMARY OF THE INVENTION

The primary object of the present invention is to provide, for the first time, a threaded closure for a pressure shell used in hollow fiber fluid separation.

The present invention comprises a substantially cylindrical shell composed of a composite wound glass filament epoxy tube, having a wall thickness selected for the desired pressure rating. Either internal or external threads are formed on the cylindrical surface at one or both ends of the pressure shell.

In one embodiment, a carefully designed threaded end plug is also included and adapted to be threadingly engaged to the cylindrical pressure shell and to provide a secure pressure resistant end closure therefore. The threaded bond between the end plug and pressure shell, as well as the filament wound epoxy shell wall, are adapted to withstand operating pressures on the order of 2000+ psi. In another embodiment, an externally threaded thick-walled ring engaged with an internally threaded shell provides a shoulder-like support for an unthreaded plug. The screw-in end plug or ring are improvements over existing means for closing the ends of pressure shells and eliminate the necessity of exactly positioning snap rings demanded by the high pressure separation usage.

These and other objects and advantages will become apparent from the detailed description of the invention which follows and which is to be taken in conjunction with the drawings.

BRIEF DESCRIPTION OF THE DRAWINGS

FIG. 3 is a detail sectional view of the O-ring seal of the present invention.

FIG. 4 is a sectional view of a pressure shell in accordance with the present invention along an entire length thereof, both ends being internally threaded.

DETAILED DESCRIPTION OF THE PREFERRED EMBODIMENTS

Figure 1:
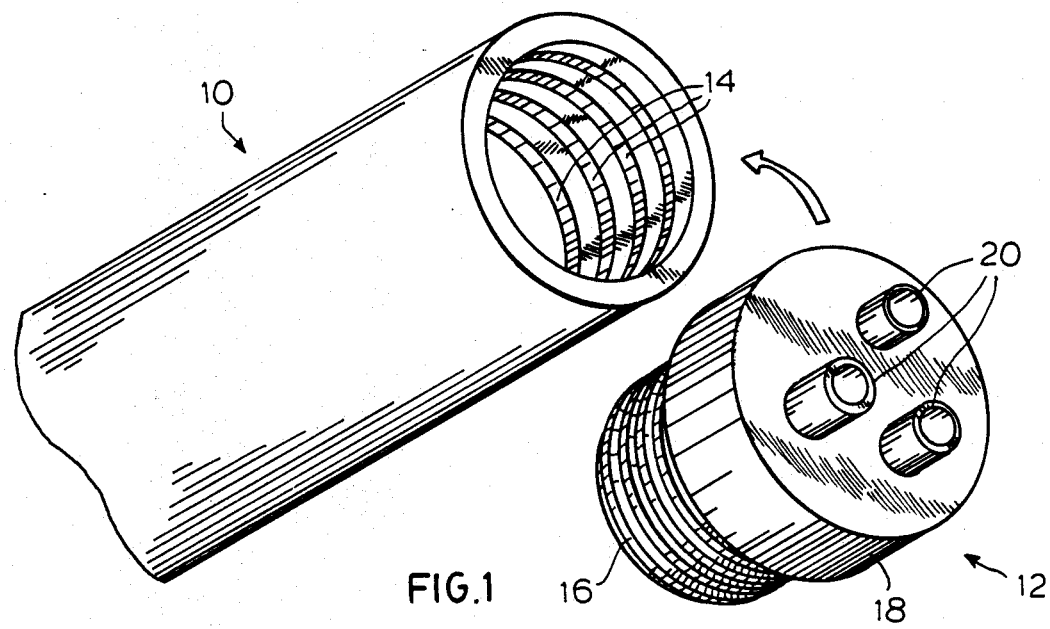
FIG. 1 is a perspective view of an externally threaded end plug and an internally threaded pressure shell in accordance with the present invention.

FIG. 1 illustrates a cylinder 10 and an end plug 12. Cylinder 10 includes internal threads 14 on one or each end thereof. Alternately the threads on cylinder 10 may be external, adapted to receive an internally threaded end plug. The cylinder 10 is composed of a fiber reinforced plastic pressure shell. It is a filament wound fiberglass shell of reinforced epoxy. Addition of a pigment to the shell is optional. This cylinder may be manufactured by wrapping needle felt on a steel mandrel, winding on thread (preferably fiberglass yarn) and saturating with epoxy. Additional layers of application may be added to build up the pressure shell for high pressure applications. The wall thickness is made to design requirements based upon the pressure rating. Generally a minimum wall thickness of 0.21" is required.

End plug 12 includes external thread 16, cap 18 and aperture cylinders 20. Threads 16 may be acme threads although the drawing shows butress threads. Cylinder apertures 20 provide means for passing feed, concentrate and permeate from within the pressure shell and within the hollow fibers to the exterior of the shell to a collecting means.

Figure 2:
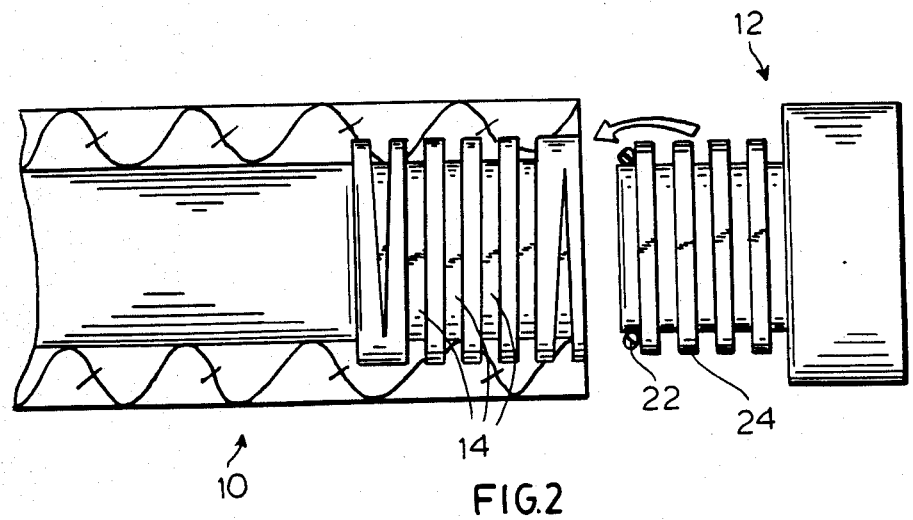
FIG. 2 is a side elevation view of an externally threaded end plug and a section view of an end of a pressure shell.
Figure 5:
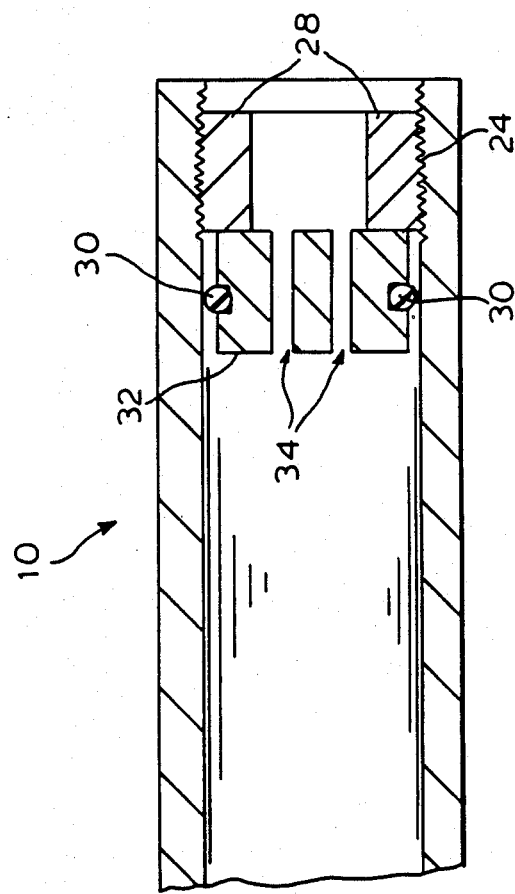
FIG. 5 is a sectional view of a pressure shell in accordance with the present invention illustrating the operation of the second embodiment.

FIG. 2 shows an O-ring seal 22 which seals end plug 12 to the interior wall of cylinder 10. The O-ring is circumferentially located about end plug 12 at a portion below the last thread 24 as shown in FIG. 2. FIGS. 3 is a detail view of the O-ring to interior cylinder wall seal.

FIG. 4 illustrates an entire cylinder 10, this embodiment having threads at each end and having an expanded diameter to accommodate the threads. End plugs, not shown, are adpated to be sealingly inserted into threaded portions 26.

Figure five illustrates the second embodiment wherein a thick wall threaded ring 28 engages shell 10 by threads 24, generating a supporting shelf whereby cylindrical unthreaded plug 32 is retained against fluid pressure. "O"-ring 30 seals against said pressure and drillings 34 in said plug provide access means for feed fluid, concentrate, or permeate.

Although a detailed description of the present invention has been provided above, it is to be understood that the scope of the invention is not to be limited thereby, but is to be determined by the claims which follow.

What is claimed is:

1. A pressure shell for housing a membrane separatory system, the pressure shell comprising a hollow body which is generally cylindrical in shape and has threads on at least one end thereof: a first threaded end plug adapted to engage the threaded interior of the hollow body, and at least one aperture in the first end plug for allowing fluid communication between the interior of the pressure shell and the outside environment and comprising a second threaded end plug and wherein the hollow body is threaded at both ends and wherein said hollow body has an external diameter in the area of the threads which is greater than its external diameter elsewhere.

2. A pressure shell according to claim 1 further comprising a sealing means on the end plug.

3. A pressure shell according to claim 2 wherein the sealing means is disposed on a forward edge of the end plug.

4. A pressure shell according to claim 3 wherein the at least one aperture in the end plug comprises three apertures having a hollow cylindrical portions extending outwardly from the end plug.

5. A pressure shell according to claim 2 wherein said end plug is unthreaded and has an indentation on its outside surface for engaging said sealing means, and further comprising a thick wall threaded ring adapted to threadingly engage the threaded portion of said hollow body, said thick wall threaded ring functioning to retain said cylindrical unthreaded plug in said hollow body under fluid pressure.

* * * * *